(12) United States Patent
Coventry, III

(10) Patent No.: US 12,656,084 B2
(45) Date of Patent: Jun. 16, 2026

(54) APPARATUS FOR AN ADAPTIVE FEEDBACK SYSTEM FOR ENHANCING BALLISTIC ACCURACY

(71) Applicant: Robert John Coventry, III, Diamond Bar, CA (US)

(72) Inventor: Robert John Coventry, III, Diamond Bar, CA (US)

( * ) Notice: Subject to any disclaimer, the term of this patent is extended or adjusted under 35 U.S.C. 154(b) by 0 days.

(21) Appl. No.: 18/381,934

(22) Filed: Oct. 19, 2023

(65) Prior Publication Data

US 2025/0130018 A1    Apr. 24, 2025

(51) Int. Cl.
*F41G 3/00* (2006.01)
*F41G 3/08* (2006.01)
*G06F 3/01* (2006.01)

(52) U.S. Cl.
CPC .............. *F41G 3/00* (2013.01); *F41G 3/005* (2013.01); *F41G 3/08* (2013.01); *G06F 3/013* (2013.01)

(58) Field of Classification Search
None
See application file for complete search history.

(56) References Cited

U.S. PATENT DOCUMENTS

| 9,173,582 B2 * | 11/2015 | Popovic | ................. A61B 5/389 |
| 11,994,364 B2 * | 5/2024 | Hamilton | .................. F41G 3/06 |
| 2015/0233674 A1 * | 8/2015 | Beckman | ................ F41A 21/48 235/407 |
| 2020/0298100 A1 * | 9/2020 | Ambinder | .......... A61N 1/36025 |

FOREIGN PATENT DOCUMENTS

| ES | 2911280 T3 * | 5/2022 | .............. F41A 17/08 |

* cited by examiner

*Primary Examiner* — Kristy A Haupt
(74) *Attorney, Agent, or Firm* — The Rapacke Law Group, P.A.

(57) ABSTRACT

The present variations disclose an apparatus or system configured to provide adaptive feedback for increasing ballistic accuracy in combat and high-precision situations. The apparatus utilizes machine learning algorithms to analyze and predict the movement of a shooter's eyes and hands when firing a weapon while continually monitoring the movements of the firearm to improve accuracy. The apparatus also utilizes a haptic, visual, and auditory feedback mechanism that provides real-time guidance and feedback on projected shot landing to enhance situational awareness and accuracy in high-stress environments. The apparatus may also include an automatic firing mechanism that enables the system to take over firing when appropriate via a human-guided mechanism to further enhance safety and effectiveness.

20 Claims, 8 Drawing Sheets

300

400

500

600

APPARATUS FOR AN ADAPTIVE FEEDBACK SYSTEM FOR ENHANCING BALLISTIC ACCURACY

TECHNICAL FIELD

The embodiments generally relate to apparatus for firearm control, accuracy, speed, and effectiveness.

BACKGROUND

Combat and high-precision situations require accurate targeting and decision-making to ensure success and prevent unnecessary casualties. However, the human body is susceptible to physical and emotional stressors that can impair accuracy and decision-making abilities. As a result, there is a need for technological solutions that can assist users in combat and high-precision situations to enhance their effectiveness and safety.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The disclosure generally relates to an apparatus that allows for increased speed, accuracy, and effectiveness to reduce the time needed to track shots of firearms, enhance visual conditions, and reduce collateral damage in combat situations. Overall, this disclosed apparatus and system has numerous potential applications in law enforcement, military, and private sectors and has the potential to be a game-changer in the field of combat and high-precision situations.

The disclosure generally relates to an apparatus including an adaptive feedback system that can be mounted to any firearm for increasing ballistic accuracy in combat and high-precision situations. The apparatus utilizes machine learning algorithms to analyze and predict the movement of a shooter's eyes and hands when firing a weapon while continually monitoring the movements of the firearm to improve accuracy. The apparatus also utilizes a haptic, visual, and auditory feedback mechanism that provides real-time guidance and feedback on projected shot landing to enhance situational awareness and accuracy in high-stress environments. The feedback can be adjusted based on the situation and the users' preferences. The apparatus may also include an automatic firing mechanism that enables the system to take over firing when appropriate via a human-guided mechanism to further enhance safety and effectiveness.

The disclosed apparatus and system utilizes machine learning algorithms to analyze and predict the movements of a soldier's eyes and hands when firing a weapon, and continually monitor the movements to improve accuracy. The machine learning algorithm may be configured to analyze and predict the movements of multiple users concurrently. The disclosed system also utilizes a feedback mechanism that provides real-time guidance and feedback on projected shot landing through haptic, visual, auditory, and other mechanisms of feedback not listed, enhancing situational awareness and accuracy in high-stress environments. The disclosed apparatus and system may also include an automatic firing mechanism that enables the system to take over firing when appropriate via a human-guided mechanism, further enhancing safety and effectiveness.

The disclosed apparatus and system has the potential to revolutionize combat and high-precision situations by improving user accuracy and decision-making abilities, potentially preventing unnecessary casualties. The multi-channel feedback system provides users with customizable feedback, allowing them to receive feedback in the most effective way for them. Additionally, the system's adaptability and flexibility enable it to adjust feedback based on the user's preferences and the situation at hand.

Overall, the disclosed apparatus and system can be a game-changer in combat and high-precision situations and has numerous potential applications in law enforcement, military, and private sectors.

The disclosed apparatus and system has numerous potential applications in law enforcement, military, and private sectors, potentially revolutionizing the field of combat and high-precision situations. The disclosed apparatus and system has the potential to be patentable due to its novel features, including the adaptive feedback system, automatic firing mechanism, and multi-channel feedback system. The adaptability and flexibility of the system make it highly customizable, potentially increasing its usefulness in various fields.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

Figure 1:
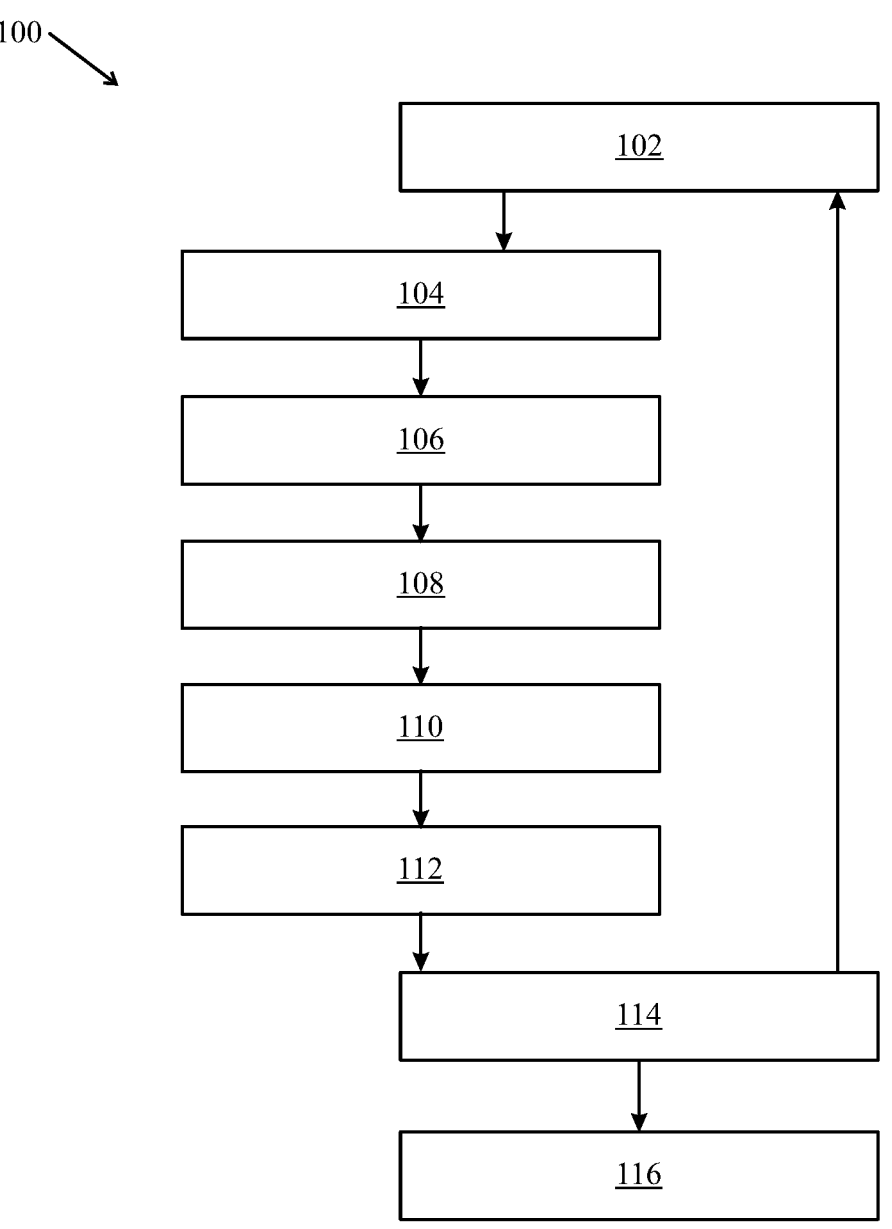
FIG. 1 includes an illustration of an apparatus for an adaptive feedback system for enhancing ballistic accuracy.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, "weapon" and variations on that term may include lethal or nonlethal projectiles, firearms, or projectile-based targeting systems or devices.

The system may utilize a feedback mechanism that provides real-time guidance and feedback on projected shot landing through haptic, visual, auditory, and other mechanisms of feedback not listed, enhancing situational awareness and accuracy in high-stress environments. The disclosed apparatus and system may also include an automatic firing mechanism that enables the system to take over firing when appropriate via a human-guided mechanism, further enhancing safety and effectiveness. This disclosed apparatus and system has the potential to revolutionize combat and high-precision situations by improving user accuracy and decision-making abilities, potentially preventing unnecessary casualties. The multi-channel feedback system provides users with customizable feedback, allowing them to receive feedback in the most effective way for them. Additionally, the system's adaptability and flexibility enable it to adjust feedback based on the user's preferences and the situation at hand. The system may include a software basis of the feedback mechanism as it might not be feasible to have an attached haptic/auditory/visual feedback system in a scenario where other devices are used. It wouldn't be feasible, for example, for a soldier wearing night-vision goggles, to consistently view a rifle-mounted camera.

The currently disclosed apparatus and system provides an adaptive feedback system for enhancing user accuracy in combat and high-precision situations, potentially preventing unnecessary casualties and increasing the effectiveness and safety of users. The disclosed apparatus and system utilizes machine learning algorithms to analyze and predict the movements of a shooter's eyes and hands when firing a weapon, and continually monitor the movements to improve accuracy. The system also provides real-time guidance and feedback on projected shot landing, identifying critical points and preventing unnecessary casualties. The disclosed apparatus and system may include an automatic firing mechanism that enables the system to take over firing when appropriate, potentially increasing the effectiveness of users in high-stress environments.

The system provides feedback through multiple channels, including haptic, visual, auditory, and other mechanisms of feedback not listed, allowing users to receive information in the most effective way for them. The system's adaptability and flexibility enable it to adjust feedback based on the user's preferences and situational context, enhancing situational awareness and accuracy in high-stress environments. The feedback system may be modular and capable of operating with variations in the input modalities and feedback mechanisms, allowing for use with eye or hand movements alone and with any single or combination of visual, auditory, or haptic feedback mechanisms."

The disclosed apparatus and system includes a user movement analysis flowchart that details the process of analyzing and predicting the movements of a soldier's eyes and hands when firing a weapon to improve accuracy. The disclosed apparatus and system includes a feedback mechanism flowchart that details the process of providing customizable feedback through multiple channels, allowing users to receive information in the most effective way for them. The disclosed apparatus and system includes a real-time guidance flowchart that details the process of providing real-time guidance and feedback on projected shot landing to enhance targeting accuracy in combat situations. The disclosed apparatus and system includes a friend or foe detection flowchart that details the process of detecting friendlies and foes and providing feedback on projected shot landing to prevent unnecessary casualties in combat situations. The disclosed apparatus and system includes an automatic firing mechanism flowchart that details the process of enabling automatic firing via a human-guided mechanism to enhance safety and effectiveness in combat situations. The disclosed apparatus and system includes a system adaptability and flexibility flowchart that details the process of adjusting feedback based on user preferences and situational context, enhancing situational awareness and accuracy in high-stress environments.

The disclosed apparatus and system has numerous potential applications in law enforcement, military, and private sectors, potentially revolutionizing the field of combat and high-precision situations. The disclosed apparatus and system has the potential to be patentable due to its novel features, including the adaptive feedback system, automatic firing mechanism, and multi-channel feedback system. The adaptability and flexibility of the system make it highly customizable, potentially increasing its usefulness in various fields.

Overall, the current disclosed apparatus and system can be a game-changer in combat and high-precision situations, potentially enhancing the effectiveness and safety of users and preventing unnecessary casualties. The system's unique features and adaptability make it a highly desirable disclosed apparatus and system for various law enforcement, military, and private sector applications. The disclosed apparatus and system's generalness and level of detail make it a potential candidate for future patents, potentially enabling further developments and improvements in the field of combat and high-precision situations.

FIG. 1 depicts an apparatus for an adaptive feedback system for enhancing ballistic accuracy including a user movement analysis flowchart 100 that describes the process of analyzing a user's eye and hand movements when firing a weapon. The process begins with data collection and processing 104, which involves collecting data on the user's eye and hand movements and processing it through machine learning algorithms 106. The algorithms 106 analyze and predict the user's movements 108, which are then fed into the feedback mechanism 110. The feedback mechanism 110 provides real-time guidance 112 to the user based on their predicted movements, enhancing their accuracy in combat or other high-precision situations. Real-time guidance 112 may be communicated to a firing mechanism 114 of a firearm and, according to some embodiments, may provide trigger assistance 116. The real-time guidance 112 and firing mechanism feedback 114 may be fed back to user and target analysis 102, to further improve operation of the system.

Figure 2:
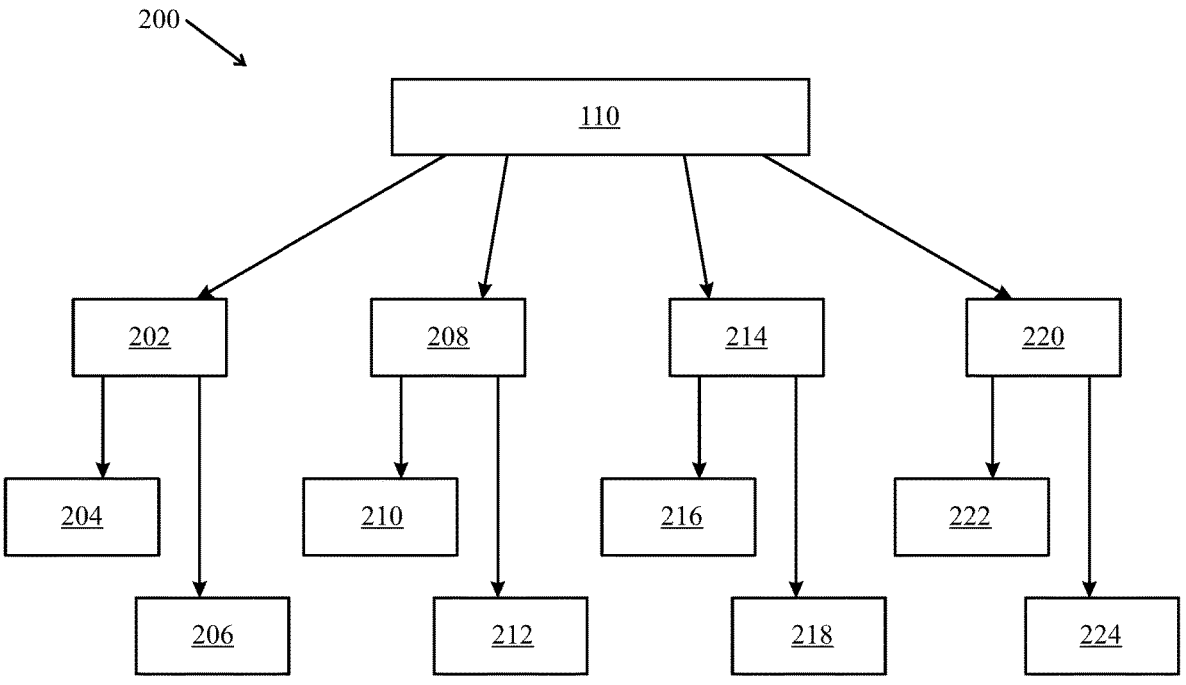
FIG. 2 includes an illustration of an apparatus for an adaptive feedback system for enhancing ballistic accuracy.

FIG. 2 depicts an apparatus for an adaptive feedback system for enhancing ballistic accuracy including a feedback mechanism flowchart 200 describes the various types of feedback 110 that the system may provide, including haptic 202, visual 208, auditory 214, and other feedback 220. The haptic feedback mechanism 202 is connected to vibration sensors 204 and force feedback mechanism 206, which can provide users with physical feedback to enhance their situational awareness. The visual feedback mechanism 208 may be connected to a head-up display 210 (HUD) and laser projection system 212, which can provide users with visual feedback on their targeting accuracy. It can also be done on a remote device itself, such as a sight. The auditory feedback mechanism 214 is connected to speakers 216 and a head-mounted display 218, which can provide users with audible cues to help them quickly and accurately acquire targets. This flowchart provides an overview of the feedback mechanisms, including other feedback mechanisms 220 and subsequent response devices 222 and the components that make up the system.

Figure 3:
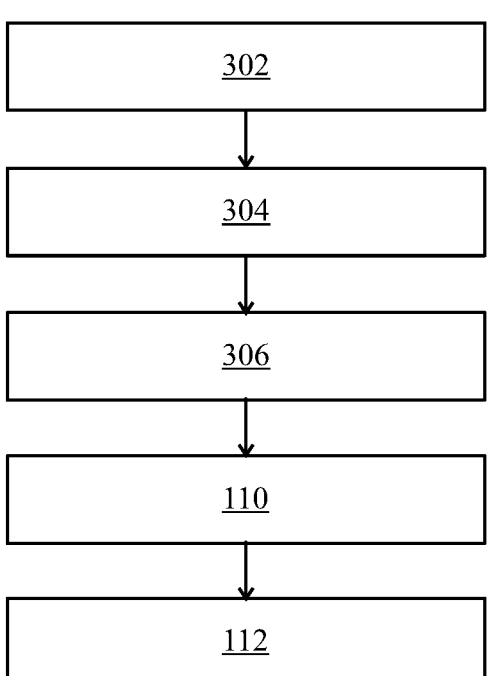
FIG. 3 includes an illustration of an apparatus for an adaptive feedback system for enhancing ballistic accuracy.

FIG. 3 depicts an apparatus for an adaptive feedback system for enhancing ballistic accuracy, including a real-time guidance flowchart 300 depicting the process of providing real-time guidance 302 to the user on hitting a target and identifying its critical points. The process begins with target identification 304, which involves detecting and analyzing the target to determine its shape and size. Once the target is identified, the system can then determine its critical points 306 and provide feedback to the user through the feedback mechanism 110. The feedback mechanism 110 is connected to the real-time guidance 112, allowing the system to continually monitor and adjust the user's movements to improve accuracy.

Figure 4:
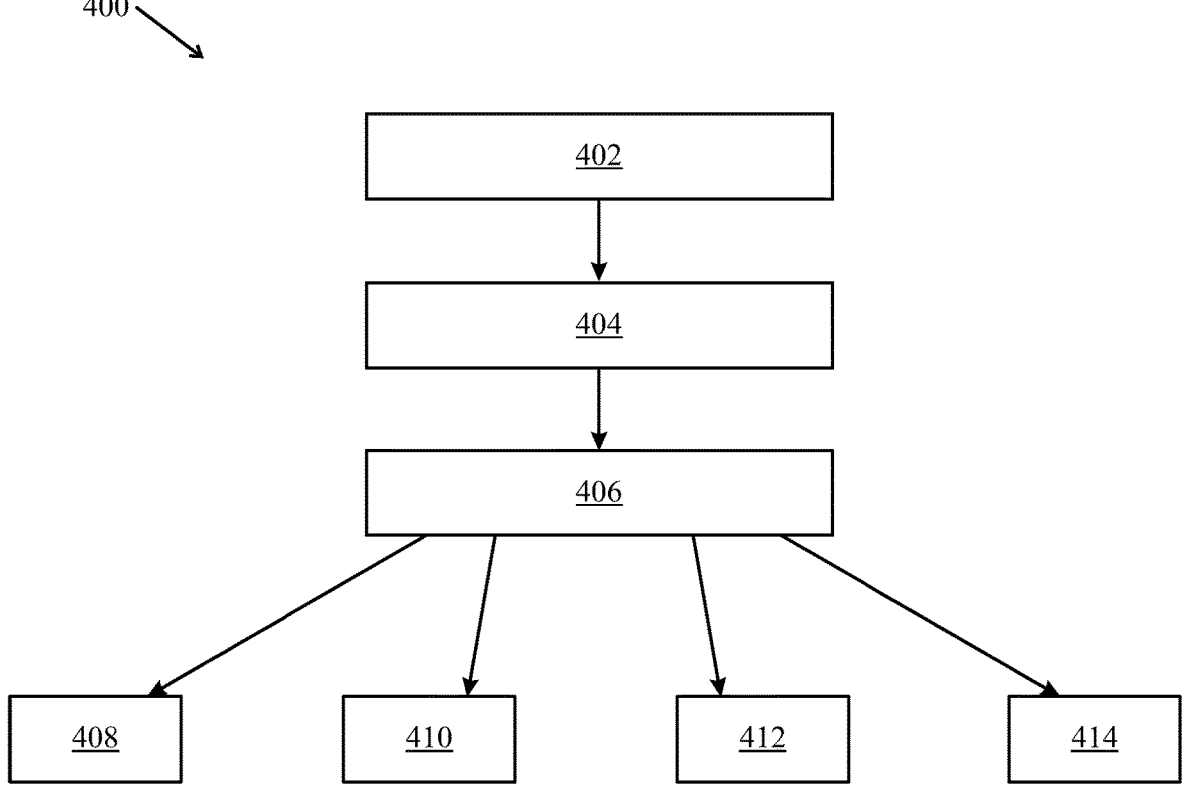
FIG. 4 includes an illustration of an apparatus for an adaptive feedback system for enhancing ballistic accuracy.

FIG. 4 depicts an apparatus for an adaptive feedback system for enhancing ballistic accuracy including a friend or foe detection flowchart 400 depicting the process of detecting foes or friendlies and providing feedback on projected shot landing, potentially preventing unnecessary casualties. The process begins with image recognition 404, which involves analyzing the target 402 to determine if it is a friendly or foe. Once the system has detected a friendly or foe 402, it can then provide real-time feedback to the user through the feedback mechanism 406. The feedback mechanism 406 is connected to visual 408, auditory 410, haptic feedback 412, and other feedback 414, allowing the system to provide feedback through multiple channels to ensure the user receives the feedback in the most effective way for them.

Figure 5:
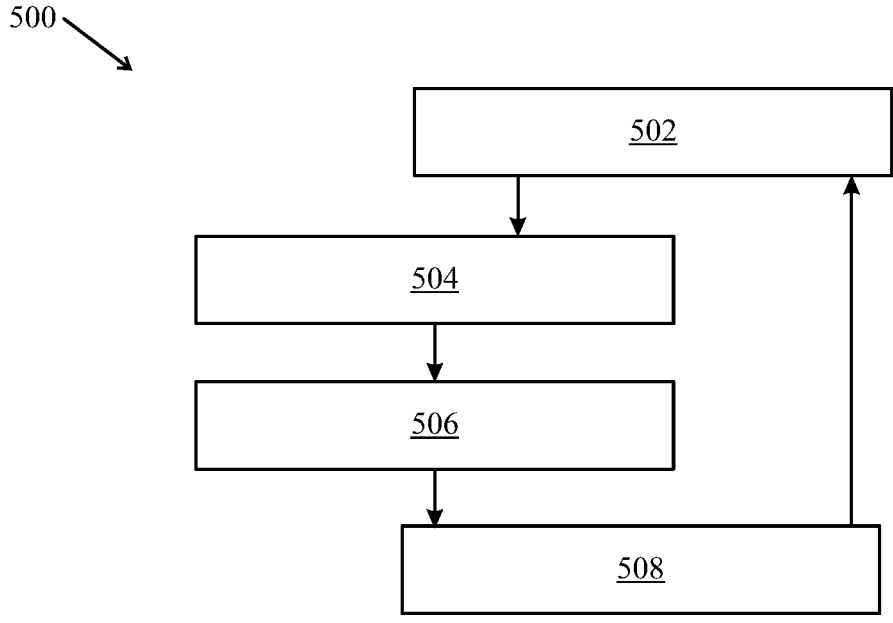
FIG. 5 includes an illustration of an apparatus for an adaptive feedback system for enhancing ballistic accuracy.

FIG. 5 depicts an apparatus for an adaptive feedback system for enhancing ballistic accuracy including a flowchart 500 detailing the process of enabling automatic firing 502 via a human-guided mechanism 504 to enhance the safety and effectiveness of users in combat situations. The human-guided mechanism 504 allows the user to manually control the firing mechanism 502, while the feedback mechanism 506 provides real-time feedback 508 to the user on their movements and ensures their accuracy. The automatic firing mechanism 502 is connected to the human-guided mechanism 504, allowing the system to take over firing when appropriate. This system provides a balance between human control and machine automation, potentially preventing unnecessary casualties and increasing the effectiveness of users in high-stress environments.

Figure 6:
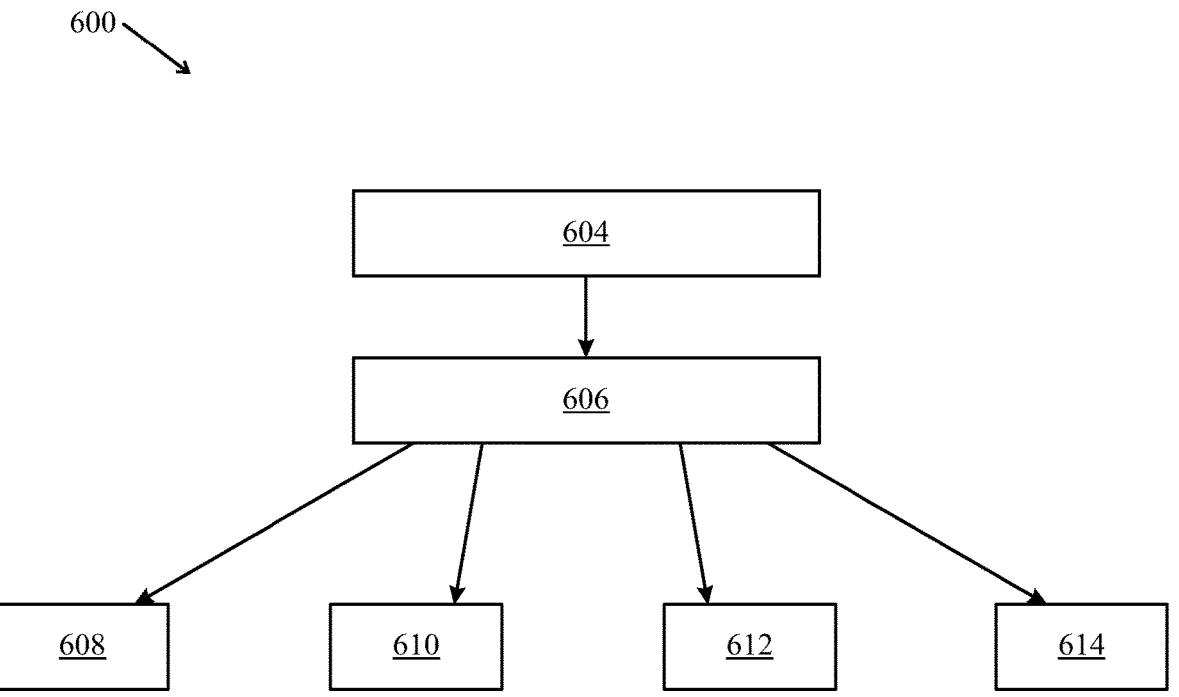
FIG. 6 includes an illustration of an apparatus for an adaptive feedback system for enhancing ballistic accuracy.

FIG. 6 depicts an apparatus for an adaptive feedback system for enhancing ballistic accuracy including a flowchart detailing the adaptability and flexibility 604 of the system in providing feedback through multiple channels 606 and enabling users to receive information in the most effective way for them. The feedback channels 606 include haptic 608, visual 610, auditory 612, and other mechanisms 614 of feedback not listed, allowing the system to provide feedback through any or all of these channels, depending on what is most effective for the user. The system adaptability and flexibility 604 are connected to the feedback channels 606, enabling the system to adjust feedback based on the user's preferences and the situation at hand. This technology has the potential to enhance situational awareness and accuracy in high-stress environments, potentially preventing unnecessary casualties and increasing the effectiveness of users in various fields, including law enforcement, military, and private sectors.

Figure 7:
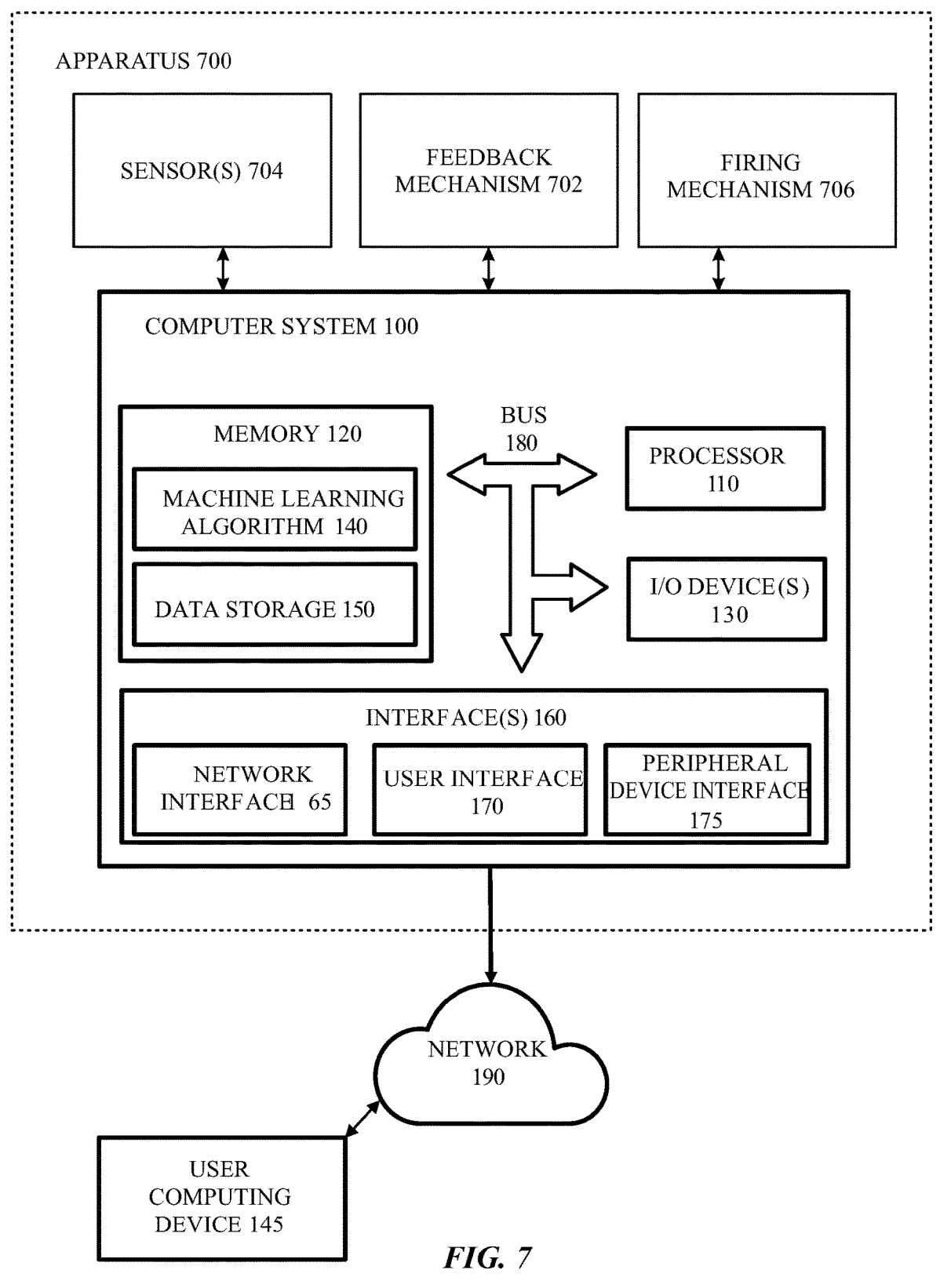
FIG. 7 includes an illustration of an apparatus for an adaptive feedback system for enhancing ballistic accuracy.

FIG. 7 illustrates an example of an apparatus for an adaptive feedback system 700 including computer system 100 that may be utilized to execute various procedures, including the processes described herein. The apparatus 700 may include sensors 704, such as a camera, a feedback mechanism 702, and a firing mechanism 706, all in operable communication with the computer system 100 and machine learning algorithm 140. Sensors may include a biometric sensor configured to monitor at least one physiological parameter of the user and provide data to the machine learning algorithm to adapt feedback. Sensors may include environmental sensors for monitoring wind, temperature, and humidity. The computer system 100 comprises a stand-alone computer or mobile computing device 145, a main-frame computer system, a workstation, a network computer, a desktop computer, a laptop, or the like integrated with the disclosed system. According to some embodiments, the computer system may be an integrated system including a processor, sensors, feedback mechanism, and firing mechanism all operatively coupled to one another. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface. The network interface may be utilized to consistently update or display relevant data to users.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, or any devices that manipulate signals based on operational instructions. For example, the processor(s) 110 may be one or more hardware processors or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the machine learning algorithm 140. Data or data sets may include information, images, video, statistics, records, or the like. In some embodiments, the machine learning algorithm 140 include software elements corresponding to one or more of the various embodiments described herein. For example, machine learning algorithm 140 may be implemented in various embodiments using any desired programming language, scripting language, or combination of programming or scripting languages (e.g., C, C++, C#, JAVA, JAVASCRIPT, PERL, etc.).

In this disclosure, terms "store," "storage," "data store," "data storage," "database," and substantially any other information storage component relevant to operation and functionality of a component are utilized to refer to "memory components," which are entities embodied in a "memory," or components comprising a memory. Those skilled in the art would appreciate that the memory or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include, for example, RAM, which can act as external cache memory. The memory or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the machine learning algorithm 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the machine learning algorithm 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The machine learning algorithm 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the machine learning algorithm 140 can be downloaded to a computing/processing device from a computer readable storage medium, or to an external computer or external storage device via a network 190 such as cloud based storage. A network adapter card or network interface in each computing/processing device receives computer readable program instructions from the network and forwards the computer readable machine learning algorithm 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), or an indirect peer-to-peer network (e.g., devices communicating through a server, router, or other network device). The network 190 can comprise copper transmission cables, optical transmission fibers, wireless transmission, routers, firewalls, switches, gateway computers or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In this disclosure, the various embodiments are described with reference to the flowchart illustrations or block diagrams of methods, apparatus (systems), and computer program products. Those skilled in the art would understand that each block of the flowchart illustrations or block diagrams, and combinations of blocks in the flowchart illustrations or block diagrams, can be implemented by computer readable program instructions. The computer readable program instructions can be provided to a processor of a general-purpose computer, special purpose computer, or other programmable data processing apparatus to produce a machine, such that the instructions, which execute via the processor of the computer or other programmable data processing apparatus, implement the functions or acts specified in the flowchart or block diagram block or blocks. The computer readable program instructions can be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart or block diagram block or blocks.

Figure 8:
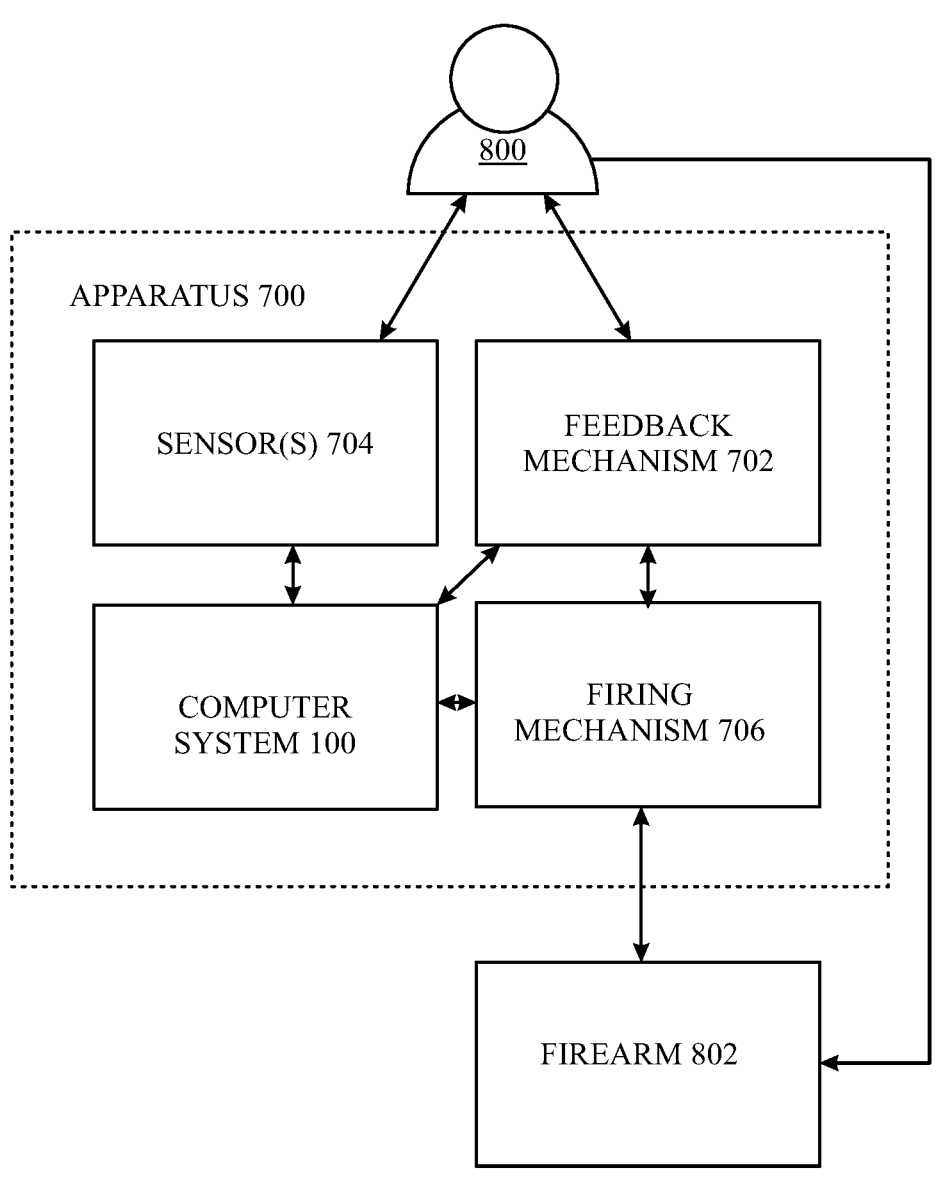
FIG. 8 includes an illustration of an apparatus for an adaptive feedback system for enhancing ballistic accuracy.

FIG. 8 illustrates an example of an apparatus for an adaptive feedback system 700 including computer system 100. The apparatus 700 may include sensors 704, such as a camera, a feedback mechanism 702, and a firing mechanism 706, all in operable communication with the computer system 100 and machine learning algorithm. The sensors 704 may be configured to monitor a user 800 operating a firearm 802. The system may utilize a feedback mechanism 702 that provides real-time guidance and feedback on projected shot landing through haptic, visual, auditory, and other mechanisms of feedback, enhancing situational awareness and accuracy in high-stress environments. The disclosed apparatus and system 700 may also include an automatic firing mechanism 706 that enables system 700 to take over firing when appropriate via a human-guided mechanism, further enhancing safety and effectiveness. The adaptive feedback mechanism 702 may enhance user accuracy in combat and high-precision situations, potentially preventing unnecessary casualties and increasing the effectiveness and safety of users. The system also provides real-time guidance and feedback via feedback mechanism 706 on projected shot landing, identifying critical points, and preventing unnecessary casualties.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a system for enhancing ballistic accuracy by providing adaptive feedback may include a processor configured to host a machine learning algorithm; a memory on which are stored machine-readable instructions including the machine learning algorithm; at least one sensor configured to monitor a user's eye movements and a user's hand movements when firing a weapon; a machine learning algorithm configured to analyze and predict a user's eye movements and a user's hand movements based on data received from the at least one sensor; a feedback mechanism in operable communication with the machine learning algorithm and the at least one sensor, the feedback mechanism being configured to provide at least one of haptic feedback, auditory feedback, or visual feedback to a user; and a firing mechanism.

Variation 2 may include a system as in variation 1, wherein the at least one sensor includes a camera.

Variation 3 may include a system as in variation 1 or 2, wherein the camera is camera to monitor a user's eye and hand movements and communicate movements to the machine learning algorithm.

Variation 4 may include a system as in any of variations 1 through 3, wherein the machine learning algorithm is configured to analyze and predict the movement of a user's eyes and hands when firing a weapon, based on movements communicated by the camera, while continually monitoring the movements of a firearm, via the camera, to improve accuracy.

Variation 5 may include a system as in any of variations 1 through 4, wherein the machine learning algorithm is configured to instruct the feedback mechanism to provide at least one of haptic, auditory, or visual feedback to the user.

Variation 6 may include a system as in any of variations 1 through 5, wherein the firing mechanism is configured to automatically fire a firearm based on the feedback provided by the feedback mechanism.

Variation 7 may include a system as in any of variations 1 through 6, wherein the system is configured to provide instantaneous, real-time guidance on hitting a target and identifying target critical points.

Variation 8 may include a system as in any of variations 1 through 7, wherein the system is capable of detecting friendlies and providing feedback on projected shot landing, potentially preventing unnecessary casualties.

Variation 9 may include a system as in any of variations 1 through 8, wherein the firing mechanism is operably coupled to a firearm.

Variation 10 may include a system as in any of variations 1 through 9, wherein the haptic feedback includes at least one motor and counterweight assembly.

Variation 11 may include a system as in any of variations 1 through 10, wherein the auditory feedback includes at least one audio speaker.

Variation 12 may include a system as in any of variations 1 through 11, wherein the visual feedback includes at least one light source.

According to variation 13, a system for enhancing ballistic accuracy by providing adaptive feedback may include a processor configured to host a machine learning algorithm; a memory on which are stored machine-readable instructions including the machine learning algorithm, the machine-readable instructions, when executed, perform the following: monitoring a user's eye movements and a user's hand movements when firing a weapon via at least one sensor; analyzing and predicting a user's eye movements and a user's hand movements, via a machine learning algorithm operably communicating with the at least one sensor, based on data received from the at least one sensor; determining that user eye movement or hand movement needs to be adjusted, based on the machine learning algorithm; and providing at least one of haptic feedback, auditory feedback, or visual feedback via a feedback mechanism in operable communication with the machine learning algorithm to indicate the need to adjust user eye movement or hand movement.

Variation 14 may include a system as in variation 13, wherein the at least one sensor includes a camera.

Variation 15 may include a system as in variation 13 or 14, wherein the machine learning algorithm is configured to analyze and predict the movement of a user's eyes and hands when firing a weapon, based on movements communicated by the camera, while continually monitoring the movements of a firearm, via the camera, to improve accuracy.

Variation 16 may include a system as in any of variations 13 through 15, wherein the machine learning algorithm is configured to instruct the feedback mechanism to provide at least one of haptic, auditory, or visual feedback to the user.

Variation 17 may include a system as in any of variations 13 through 16, further including a firing mechanism configured to automatically fire a firearm based on the feedback provided by the feedback mechanism.

Variation 18 may include a system as in any of variations 13 through 17, wherein the system is configured to provide instantaneous, real-time guidance on hitting a target and identifying target critical points.

Variation 19 may include a system as in any of variations 13 through 18, wherein the system is capable of detecting friendlies and providing feedback on projected shot landing, potentially preventing unnecessary casualties.

According to variation 20, a system for enhancing ballistic accuracy by providing adaptive feedback may include a processor configured to host a machine learning algorithm; a memory on which are stored machine-readable instructions including the machine learning algorithm, the machine-readable instructions, when executed, perform the following: monitoring a user's eye movements and a user's hand movements when firing a weapon via at least one camera; analyzing and predicting a user's eye movements and a user's hand movements, via a machine learning algorithm operably communicating with the at least one camera, based on data received from the at least one camera; determining that user eye movement or hand movement needs to be adjusted, based on the machine learning algorithm; and providing at least one haptic feedback via a motor and counterweight, auditory feedback via at least one audio speaker, or visual feedback via at least one light source, the at least one haptic feedback being delivered via a feedback mechanism in operable communication with the machine learning algorithm to indicate the need to adjust user eye movement or hand movement, wherein; and automatically firing a firearm based on the feedback provided by the feedback mechanism via a firing mechanism.

Several different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A system for enhancing ballistic accuracy by providing adaptive feedback comprising:
   a processor configured to host a machine learning algorithm;

a memory on which are stored machine-readable instructions comprising the machine learning algorithm;
   at least one sensor comprising a camera configured to monitor a user's eye movements and a user's hand movements when firing a weapon;
   a machine learning algorithm configured to analyze eye and hand movements, user posture, grip strength, muscle tension, body motion, and physiological state based on data received from the at least one sensor comprising the camera;
   a feedback mechanism in operable communication with the machine learning algorithm and the at least one sensor, the feedback mechanism being configured to provide at least one haptic feedback via a motor and counterweight, auditory feedback via at least one audio speaker, or visual feedback via at least one light source to a user to indicate a need to adjust the user's eye movement or hand movement; and
   a firing mechanism configured to automatically fire a firearm based on the feedback provided by the feedback mechanism.

2. A system for enhancing ballistic accuracy by providing adaptive feedback as in claim 1, wherein the at least one sensor comprises at least one of a camera, microphone, accelerometer, gyroscope, biometric sensor, or environmental sensor.

3. A system for enhancing ballistic accuracy by providing adaptive feedback as in claim 2, wherein the camera is camera to monitor a user's eye and hand movements and communicate movements to the machine learning algorithm to improve user accuracy.

4. A system for enhancing ballistic accuracy by providing adaptive feedback as in claim 3, wherein the machine learning algorithm is configured to analyze and predict the movement of a user's eyes and hands when firing a weapon, based on movements communicated by the at least one camera, microphone, accelerometer, gyroscope, biometric sensor, or environmental sensor, while continually monitoring the movements of a firearm, via the at least one camera, microphone, accelerometer, gyroscope, biometric sensor, or environmental sensor, to improve accuracy.

5. A system for enhancing ballistic accuracy by providing adaptive feedback as in claim 4, wherein the machine learning algorithm is configured to instruct the feedback mechanism to provide at least one of haptic, auditory, or visual feedback to the user.

6. A system for enhancing ballistic accuracy by providing adaptive feedback as in claim 1, wherein the firing mechanism is configured to adapt the firing parameters based on the real-time feedback.

7. A system for enhancing ballistic accuracy by providing adaptive feedback as in claim 1, wherein the system is configured to enable user, group, or agency-specific critical point designation for targets, adaptable for different contexts and use of force requirements.

8. A system for enhancing ballistic accuracy by providing adaptive feedback as in claim 1, wherein the system is configured to provide guidance on hitting a stationary or a moving target.

9. A system for enhancing ballistic accuracy by providing adaptive feedback as in claim 1, wherein the system incorporates at least one of angle, distance, velocity, bullet type, target conditions, predicted movement, actual movement, known data armor, carriage of a weapon, wind, elevation, or weather conditions.

10. A system for enhancing ballistic accuracy by providing adaptive feedback as in claim 1, wherein the haptic feedback comprises at least one motor and counterweight assembly.

11. A system for enhancing ballistic accuracy by providing adaptive feedback as in claim 1, wherein the auditory feedback comprises at least one audio speaker.

12. A system for enhancing ballistic accuracy by providing adaptive feedback as in claim 1, wherein the visual feedback comprises at least one light source.

13. A system for enhancing ballistic accuracy by providing adaptive feedback as in claim 1, wherein the at least one sensor comprises a camera.

14. A system for enhancing ballistic accuracy by providing adaptive feedback as in claim 13, wherein the machine learning algorithm is configured to analyze and predict the movement of a user's eyes and hands when firing a weapon, based on movements communicated by the camera, while continually monitoring the movements of a firearm, via the camera, to improve accuracy.

15. A system for enhancing ballistic accuracy by providing adaptive feedback as in claim 14, wherein the machine learning algorithm is configured to instruct the feedback mechanism to provide at least one of haptic, auditory, or visual feedback to the user.

16. A system for enhancing ballistic accuracy by providing adaptive feedback, comprising:

a processor configured to host a machine learning algorithm;

a memory on which are stored machine-readable instructions comprising the machine learning algorithm, the machine-readable instructions, when executed, perform the following:

monitoring a user's eye movements and a user's hand movements when firing a weapon via at least one sensor comprising a camera;

analyzing and predicting a user's eye movements and a user's hand movements, via a machine learning algorithm operably communicating with the at least one sensor, based on data received from the at least one sensor comprising the camera;

determining that user eye movement or hand movement needs to be adjusted, based on the machine learning algorithm; and providing at least one haptic feedback via a motor and counterweight, auditory feedback via at least one audio speaker, or visual feedback via at least one light source, the providing being performed via a feedback mechanism in operable communication with the machine learning algorithm to indicate the need to adjust user eye movement or hand movement; and automatically firing a firearm based on the feedback provided by the feedback mechanism via a firing mechanism.

17. A system for enhancing ballistic accuracy by providing adaptive feedback as in claim 16, further comprising a firing mechanism configured to automatically fire a firearm based on the feedback provided by the feedback mechanism.

18. A system for enhancing ballistic accuracy by providing adaptive feedback as in claim 16, wherein the system is configured to enable user, group, or agency-specific critical point designation for targets, adaptable for different contexts and use of force requirements.

19. A system for enhancing ballistic accuracy by providing adaptive feedback as in claim 16, wherein the system is capable of detecting friendlies and providing feedback on projected shot landing, potentially preventing unnecessary casualties.

20. A system for enhancing ballistic accuracy by providing adaptive feedback, comprising:

a processor configured to host a machine learning algorithm; a memory on which are stored machine-readable instructions comprising the machine learning algorithm, the machine-readable instructions, when executed, perform the following:

monitoring a user's eye movements and a user's hand movements when firing a weapon via at least one camera; analyzing and predicting a user's eye movements and a user's hand movements, via a machine learning algorithm operably communicating with the at least one camera, based on data received from the at least one camera; determining that user eye movement or hand movement needs to be adjusted, based on the machine learning algorithm; and providing at least one haptic feedback via a motor and counterweight, auditory feedback via at least one audio speaker, or visual feedback via at least one light source, the at least one haptic feedback being delivered via a feedback mechanism in operable communication with the machine learning algorithm to indicate the need to adjust user eye movement or hand movement; and automatically firing a firearm based on the feedback provided by the feedback mechanism via a firing mechanism.

* * * * *